United States Patent
Rivera

(12) 
(10) Patent No.: US 6,234,372 B1
(45) Date of Patent: May 22, 2001

(54) COMBINATION BICYCLE MOUNT AND COLLAPSIBLE HOLDER TO BE COUPLED TO A TRAILER HITCH OF A MOTOR VEHICLE

(76) Inventor: George Rivera, 4305 N. Sunflower, Covina, CA (US) 91724

( * ) Notice: Subject to any disclaimer, the term of this patent is extended or adjusted under 35 U.S.C. 154(b) by 0 days.

(21) Appl. No.: 09/415,243

(22) Filed: Oct. 12, 1999

(51) Int. Cl.$^7$ ........................................ B60R 9/10
(52) U.S. Cl. ................ 224/536; 224/497; 224/502; 224/504; 224/521; 224/532; 224/535; 224/537; 224/924
(58) Field of Search .................. 224/924, 488, 224/495, 497, 502, 504–509, 518–521, 531, 532, 533, 535–537

(56) References Cited

U.S. PATENT DOCUMENTS

| | | | |
|---|---|---|---|
| 1,808,042 | * 6/1931 | Kennedy | 224/508 X |
| 4,143,799 | * 3/1979 | Dietlein et al. | 224/536 |
| 4,411,580 | * 10/1983 | Kelly | 224/531 X |
| 4,483,468 | * 11/1984 | Lucas | 224/531 X |
| 4,848,112 | * 7/1989 | Graber et al. | 224/315 X |
| 4,948,021 | * 8/1990 | Murphy et al. | 224/509 X |
| 5,094,373 | * 3/1992 | Lovci | 224/924 X |
| 5,104,015 | * 4/1992 | Johnson | 224/505 X |
| 5,205,446 | * 4/1993 | Greenberg | 224/507 X |
| 5,277,346 | * 1/1994 | Stier | 224/536 X |
| 5,303,857 | * 4/1994 | Hewson | 224/924 X |
| 5,443,189 | * 8/1995 | Hirschfeld | 224/536 X |
| 5,464,140 | * 11/1995 | Hill | 224/315 X |
| 5,518,159 | * 5/1996 | DeGuevara | 224/509 X |
| 5,638,706 | * 6/1997 | Stevens | 224/924 X |
| 5,662,256 | * 9/1997 | Bryan | 224/924 X |
| 5,664,717 | * 9/1997 | Joder | 224/924 X |
| 5,752,639 | * 5/1998 | Rice | 224/521 |
| 5,884,826 | * 3/1999 | Shaver | 224/532 X |
| 5,950,891 | * 9/1999 | Brungardt et al. | 224/924 X |

* cited by examiner

*Primary Examiner*—Gregory M. Vidovich
(74) *Attorney, Agent, or Firm*—Morland C. Fischer

(57) ABSTRACT

A combination bicycle mount and a collapsible holder by which the bicycle mount is removably coupled to an existing trailer hitch of a motor vehicle. With the bicycle mount uncoupled from the collapsible holder, the holder is adapted to be folded into a compact package to facilitate transport and storage between uses. The bicycle mount includes upper and lower retaining plates between which a single bicycle frame bar or a pair of bicycle frame bars are received and retained. A threaded locking bolt extends between the upper and lower retaining plates to be rotated in either a first direction to cause the retaining plates to move together to establish a clamping force against the bicycle frame bars or an opposite direction to reduce the clamping force. A cranking tab is pivotally connected to the head of the locking bolt to be rotated between a locked position at which to prevent the locking bolt from being rotated and an unlocked position at which to permit the locking bolt to be rotated.

13 Claims, 4 Drawing Sheets

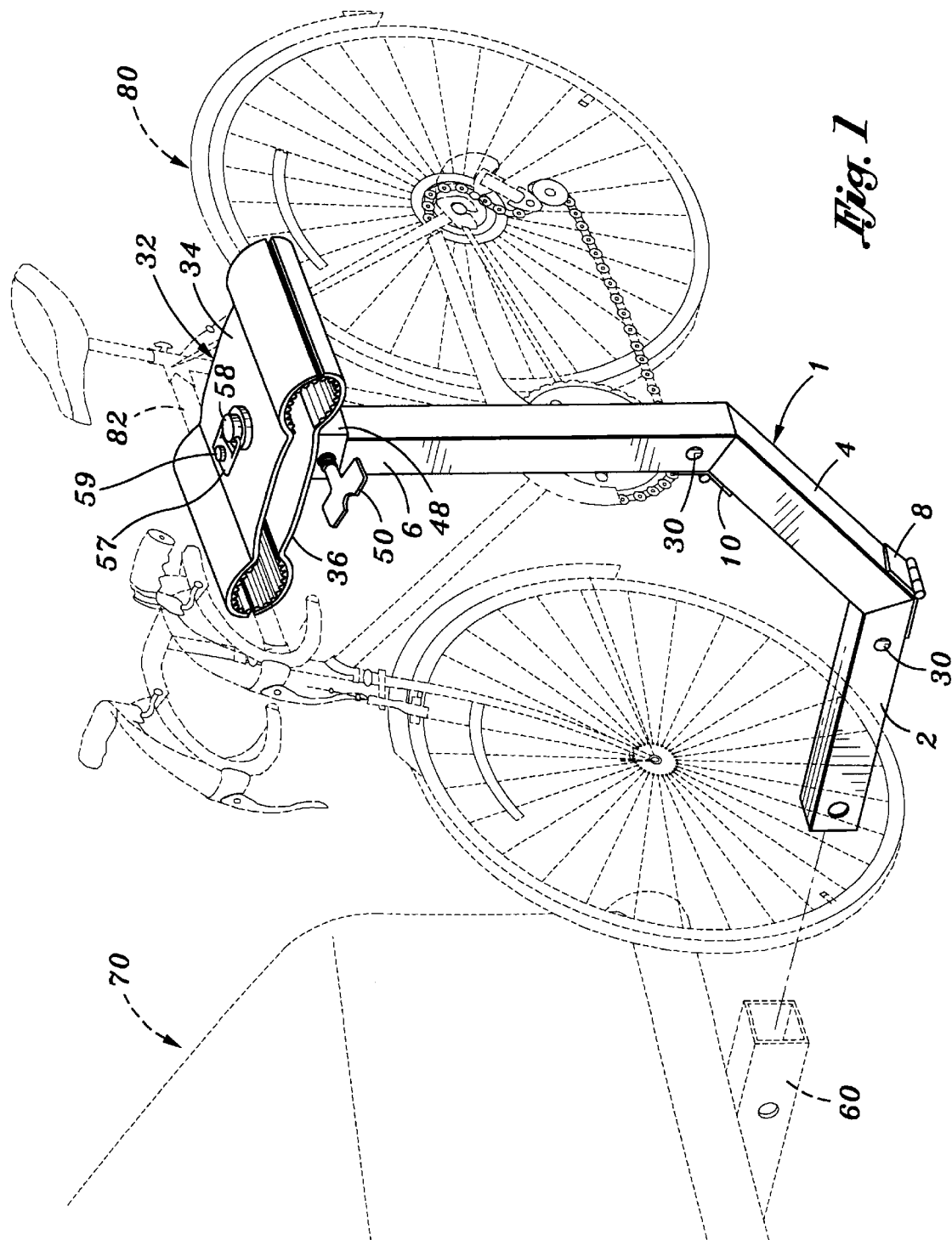

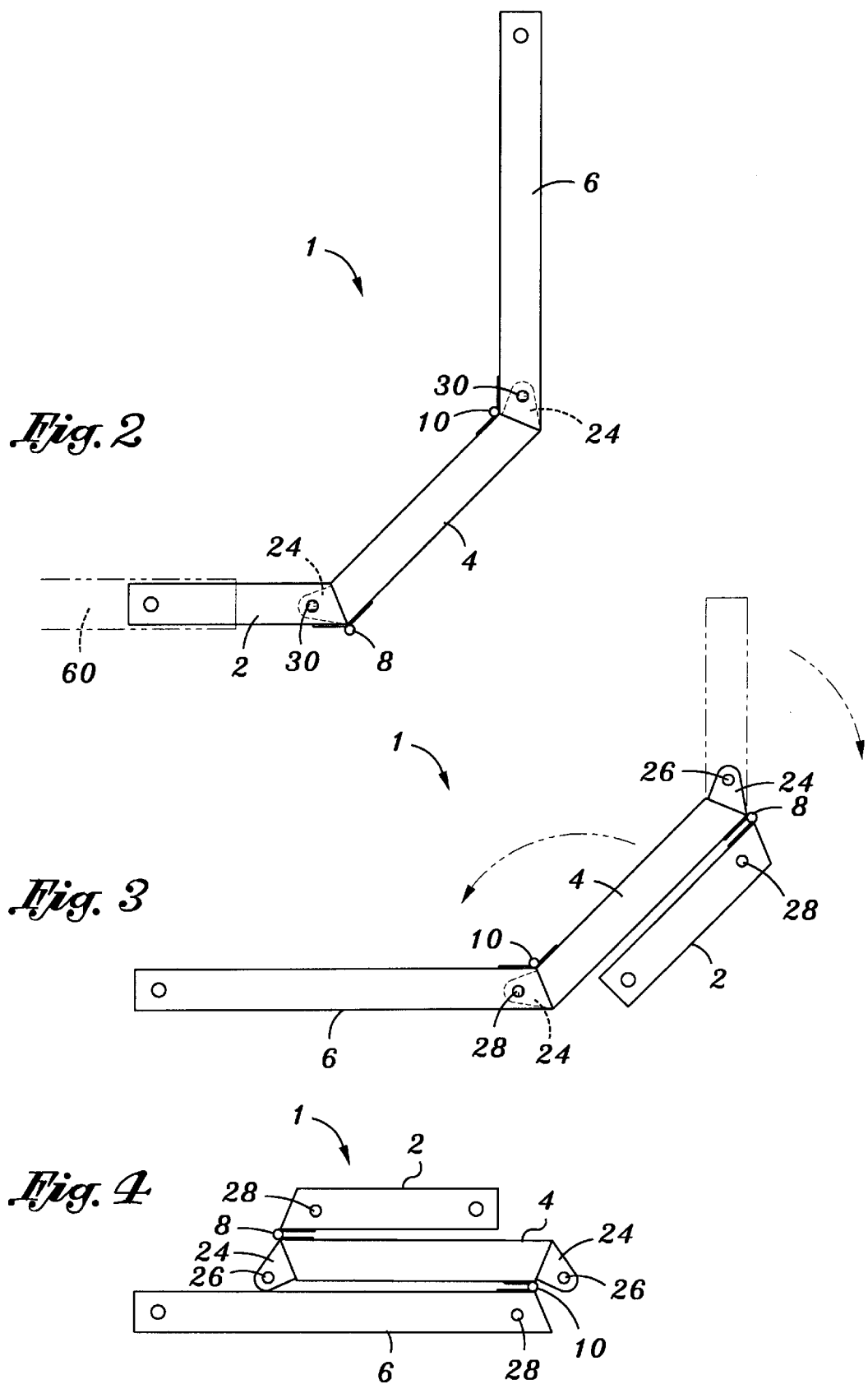

COMBINATION BICYCLE MOUNT AND COLLAPSIBLE HOLDER TO BE COUPLED TO A TRAILER HITCH OF A MOTOR VEHICLE

BACKGROUND OF THE INVENTION

1. Field of the Invention

This invention relates to a collapsible holder that is adapted to be removably connected to a motor vehicle at a conventional trailer hitch and folded into a compact package to facilitate transport thereof between uses. A unique bicycle mount is coupled to the collapsible holder, whereby a pair of bicycles may be conveniently carried by the vehicle.

2. Background Art

In my patent application Ser. No. 09/347,566 filed Jul. 6, 1999, a collapsible holder is disclosed to be removably connected to a conventional trailer hitch at the rear of a motor vehicle. More particularly, my collapsible holder is adapted to support a folding table and an outdoor grille of the type commonly used during a barbecue. By virtue of the foregoing, a family does not have to experience the inconvenience and waste of time that are sometimes associated with having to locate an available picnic area at which food can be cooked. That is to say, the aforementioned holder can be easily coupled to the trailer hitch attached to the family vehicle to enable a picnic, cook out, or the like, to be held along side the vehicle while avoiding the necessity of having to find a picnic table or an outdoor grille that is not in use. Thus, food can be cooked at any suitable location, including those (e.g. the parking lot of a sports stadium) at which a table and a grille are not often or easily found. Once the cook out has been completed, the collapsible holder is uncoupled from the trailer hitch and folded into a compact package to facilitate storage and transport.

Because of its compact nature and versatility, it would be desirable to be able to use the collapsible holder described in my earlier patent application to couple objects, other than a table or an outdoor grille, to the trailer hitch of a motor vehicle. One additional use that I have contemplated for my collapsible holder is to enable a bicycle to be conveniently transported at the rear of the vehicle without damage to the bicycle or the vehicle while leaving the interior of the vehicle free to carry passengers. Therefore, what is needed to accomplish this additional use is a bicycle mount that can be quickly and easily coupled to and removed from my collapsible holder so as to reliably support and retain one or more bicycles to be carried by a motor vehicle to which a trailer hitch has been attached.

One example of a bicycle rack that is coupled to a trailer hitch of a motor vehicle is available by referring to U.S. Pat. No. 5,752,639 issued May 19, 1999.

SUMMARY OF THE INVENTION

In general terms, a combination collapsible holder and bicycle mount is disclosed by which either one or a pair of bicycles can be carried at the rear of a motor vehicle. One end of the collapsible holder is adapted to be removably attached to a conventional trailer hitch at the rear of the motor vehicle. The bicycle mount is adapted to be coupled to the opposite end of the collapsible holder. The collapsible holder has a middle arm member that is pivotally connected at each end thereof between a pair of outer arm members. One of the pair of outer arm members is detachably connected to the trailer hitch. When the bicycle mount is uncoupled from the collapsible holder and the holder is removed from the trailer hitch, the holder can be folded into a compact package that is suitable for transport and storage between uses. More particularly, a first of the pair of outer arm members is rotated into face-to-face alignment with the middle arm member, and the middle arm member is then rotated into face-to-face alignment with the second outer arm member.

In accordance with the present improvement, the bicycle mount includes upper and lower retaining plates that are held in spaced alignment, one above the other, by means of a threaded locking bolt. A pair of gripping portions are located at each of the ends of the upper and lower retaining plates in order to receive and retain the frame bar of a bicycle therebetween. Projecting downwardly from the lower retaining plate is a hollow coupling post that is sized to receive and surround one of the outer arm members of the collapsible holder, whereby the bicycle mount is removably coupled to the holder.

The aforementioned threaded locking bolt extends through axially aligned openings in the upper and lower retaining plates of the bicycle mount for receipt by a correspondingly threaded lug that depends downwardly from the lower retaining plate. When the locking bolt is rotated in a first direction so as to move towards and into locking engagement with the threaded lug, the upper retaining plate is correspondingly moved towards the lower retaining plate to increase the clamping pressure between the pairs of gripping portions. In this same regard, when the locking bolt is rotated in a second, opposite direction so as to move away from and out of locking engagement with the threaded lug, the upper retaining plate is correspondingly moved away from the lower retaining plate to decease the clamping pressure between the pairs of gripping portions. A normally expanded coil spring surrounds the locking bolt between the upper and lower retaining plates to release stored energy and thereby urge the upper retaining plate to move away from the lower retaining plate when the locking bolt is rotated in the second direction and out of locking engagement with the threaded lug.

To prevent an unintentional rotation of the locking bolt in the second direction and an unintended decrease of the clamping force between the pairs of gripping portions as could be caused by vibrations generated by the motor vehicle, a cranking tab is pivotally connected to a relatively wide head of the locking bolt that sits atop the upper retaining plate of the bicycle mount. With the cranking tab rotated to a horizontal, locked position, a locking arm is slidably received through the cranking tab and a pair of axially aligned apertures in the upper and lower retaining plates. The cranking tab is then anchored in place relative to the locking bolt to prevent a displacement of the cranking tab and a rotation of the locking bolt. When the locking arm is withdrawn from the apertures in the retaining plates so as to slide out of receipt by the cranking tab, the cranking tab can be rotated to a vertical, unlocked position standing above the head of the locking bolt. A cranking force may now be applied to the cranking tab to cause the locking bolt to rotate in the first or second directions whereby to either increase or decrease the clamping force applied by the pair of griping portions at the opposite ends of the upper and lower retaining plates of the bicycle mount. dr

BRIEF DESCRIPTION OF THE DRAWINGS

FIG. 1 shows my collapsible holder coupled at one end thereof to the trailer hitch of a motor vehicle and at the opposite end to the bicycle mount which forms the present improvement;

FIGS. 2–4 illustrate the steps by which the collapsible holder of FIG. 1 is folded into a compact package after the bicycle mount has been uncoupled therefrom;

DETAILED DESCRIPTION

The collapsible holder 1 to which the bicycle mount 32 that forms the present improvement is removably coupled is identical to the collapsible holder that was described in my earlier patent application Ser. No. 09/347,566 filed Jul. 6, 1999, the teachings of which are incorporated herein by reference. Therefore, only a brief description of the collapsible holder 1 will be provided below while referring concurrently to FIGS. 1–4 of the drawings.

Figure 6:
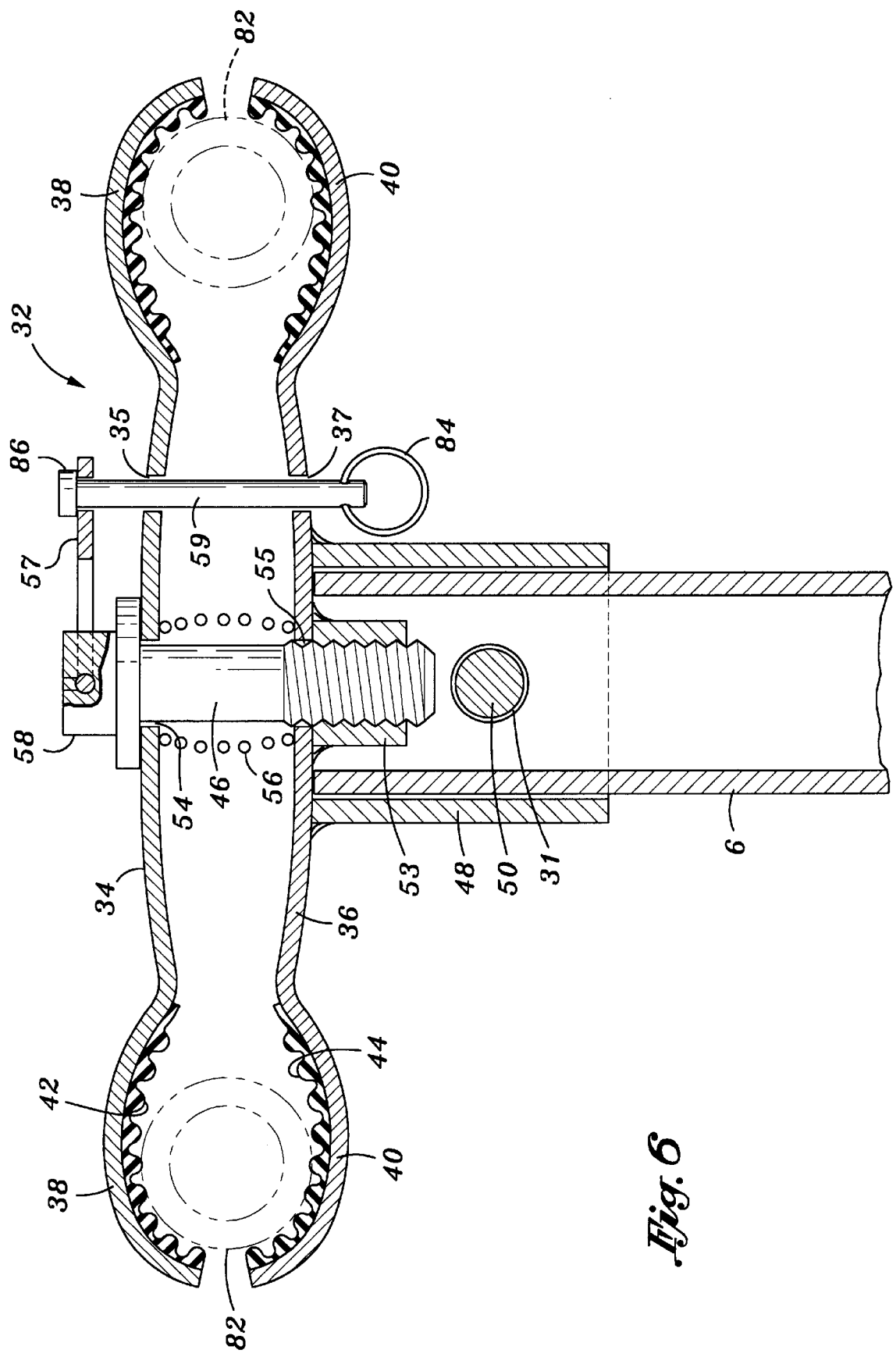
FIG. 6 is a cross-section showing the bicycle mount removably coupled to the collapsible holder in order to receive and retain the frames of a pair of bicycles.

The collapsible holder 1 has three arm members 2, 4 and 6 that are connected end-to-end and rotatable relative to one another by means of hinges 8 and 10 so as to extend between the existing trailer hitch 60 of a motor vehicle 70 and the bicycle mount 32 so that either a single bicycle 80 as shown in FIG. 1 or a pair of bicycles as illustrated in FIG. 6 can be carried at the rear of the vehicle in a manner that will be disclosed in greater detail hereinafter. However, it should be understood that the collapsible holder described in my earlier patent application Ser. No. 09/347,566 is reversed when it is to be used for the purpose described herein to couple the bicycle mount 32 to the trailer hitch 60.

Each of the arm members 2, 4 and 6 of the collapsible holder 1 is manufactured from open ended steel channel. A middle arm member 4 is located between and is pivotally connected to each of the outer arm members 2 and 6. When employed to carry the bicycle mount 32, the outer arm member 2 that is coupled to trailer hitch 60 is about one half as long (e.g. twelve inches) as the outer arm member 6 (e.g. twenty three inches) that is coupled to the bicycle mount 32. The middle arm member 4 (e.g. fifteen inches long) is provided with a pair of joints 24 that project from opposite ends thereof (best shown in FIG. 4). Each joint 24 has a pin hole 26. The joints 24 of middle arm member 4 are received within the open ends of the adjacent outer arm members 2 and 6 such that the pin holes 26 of the joints 24 are aligned with pin holes 28 formed at the receiving ends of the outer arm members 2 and 6. Locking pins 30 are removably received through the axially aligned pin holes 28 and 26 in the receiving ends of the outer arm members 2 and 6 and the joints 24 of middle arm member 4 so that the arm members 2, 4 and 6 can be rotated relative to one another and retained in the outstretched configuration shown in FIGS. 1 and 2 between trailer hitch 60 and bicycle mount 32.

In the assembled configuration, a first hinge 8 is connected to each of the outer and middle arm members 2 and 4 at the interface therebetween, and a second hinge 10 is connected to each of the middle and outer arm members 4 and 6 at the interface therebetween. A cut out (not shown) is formed in the receiving end of each outer arm member 2 and 6 to enable the arm members 2, 4 and 6 of collapsible holder 1 to be rotated and folded one above the other.

FIGS. 2–4 of the drawings illustrate the collapsible nature of the holder 1 to which the bicycle mount 32 of this invention is coupled. FIG. 2 shows the collapsible holder 1 fully employed in an outstretched condition so that the bicycle mount 32 and at least one bicycle 80 can be supported from the trailer hitch 60 of the motor vehicle 70.

However, after the bicycle mount 32 has been uncoupled from the collapsible holder 1, it may be desirable to remove the holder from the hitch 60 so that is can be stored away to await the next use. To facilitate storage, the holder is collapsed from the outstretched condition of FIG. 2 into a compact package as shown in FIG. 4. To achieve this compact package following the removal of the collapsible holder 1 from hitch 60, the locking pins 30 are first removed from pin holes 26 and 28. Then, and as shown in FIG. 3, the outer arm member 2 is rotated around its hinge 8 so as to lie against and in face to face alignment with the middle arm member 4. Next, and as is shown in FIG. 4, the middle arm member 4 is rotated around its hinge 10 so as to lie against and in face to face alignment with the outer arm member 6. In the compact folded package of FIG. 4, the outer and middle arm members 2, 4 and 6 of collapsible holder 1 are positioned one over the other.

Figure 5:
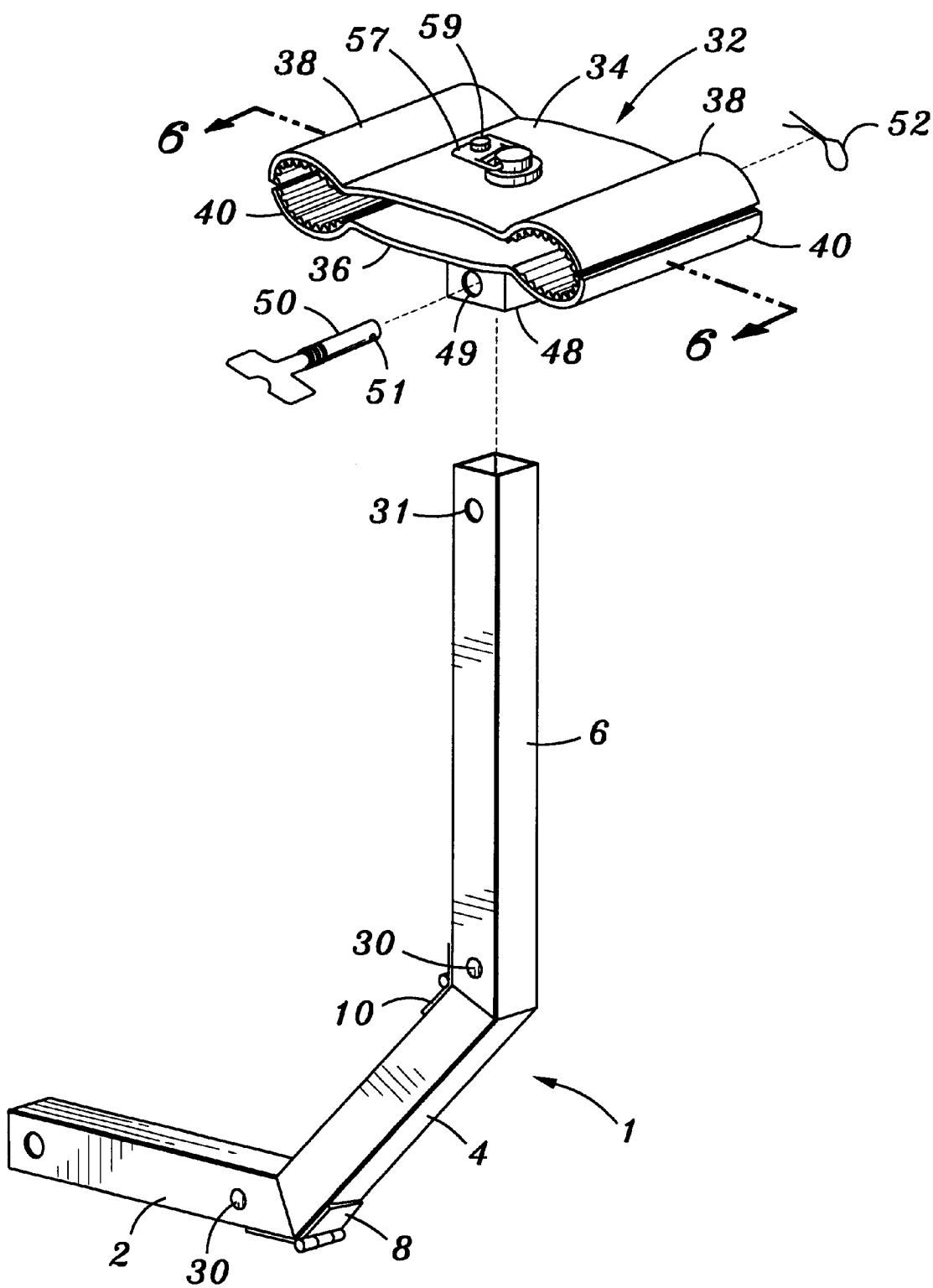
FIG. 5 is an exploded view of the combination collapsible holder and bicycle mount.

Details of the bicycle mount 32 and the means for detachably coupling the bicycle mount 32 to the collapsible holder 1 of FIGS. 1–4 are now disclosed while referring to FIGS. 5 and 6 of the drawings. Bicycle mount 32 has an upper retaining plate 34 and a lower retaining plate 36. Each of the upper and lower retaining plates 34 and 36 has a pair of arcuate, opposite facing gripping portions 38 and 40 at each end thereof. Ribbed (e.g. plastic or rubber) gripping surfaces 42 and 44 are bonded to respective gripping portions 38 and 40 of the upper and lower retaining plates 34 and 36. As will soon be described, a locking bolt 46 holds the upper and lower retaining plates 34 and 36 of bicycle mount 32 in spaced alignment, one above the other, so that the frame bar (shown in phantom lines and represented by the reference number 82) of a bicycle (designated 80 in FIG. 1) can be retained between pairs of gripping portions 38 and 40 located at the opposite ends of the retaining plates 34 and 36.

Depending downwardly from the lower retaining plate 36 of bicycle mount 32 is a hollow coupling post 48. Coupling post 48 is sized to receive and surround the outer arm member 2 of the collapsible holder 1. As is best shown in FIG. 5, pairs of axially aligned holes 31 and 49 (only one hole of each pair of holes being shown) are formed through opposite faces of the outer arm member 2 of holder 1 and the coupling post 48 of bicycle mount 32. In the assembled configuration of FIG. 6, with the arm member 2 received in and surrounded by the hollow coupling post 48, a locking pin 50 is inserted through the pairs of axially aligned holes 31 and 49. The locking pin 50 has an aperture 51 formed through one end thereof to receive a resilient (i.e. spring biased) locking clip 52.

With the locking pin 50 inserted through the holes 31 and 49 of the arm member 6 and the hollow coupling post 48, the bicycle mount 32 will be detachably coupled to the collapsible holder 1. The locking clip 52 received through the aperture 51 in the locking pin 50 prevents the inadvertent removal of the locking pin 50 and an unintentional separation of the bicycle mount 32 from the collapsible holder 1. Of course, when it is desirable to detach the mount 32 from holder 1 (e.g. when the holder is to be uncoupled from the motor vehicle to be collapsed into a compact storage package as disclosed above), the locking clip 52 is removed from the locking pin 50 to enable the locking pin to be pulled outwardly and withdrawn from the pair of holes 49 and 31. The coupling post 48 of bicycle mount 32 may then slide off the outer arm member 6 of collapsible holder 1.

Also projecting downwardly from the lower retaining plate 36 of bicycle mount 32 is a threaded lug 53. The threaded lug 53 is coaxially aligned with openings 54 and 55

(best shown in FIG. 6) formed through the upper and lower retaining plates 34 and 36. In the assembled configuration, the locking bolt 46 is received through each of the coaxially aligned openings 54 and 55 and the lug 53. The shank of the locking bolt 46 is threaded so as to be mated to the correspondingly threaded lug 53. It may be appreciated that rotating the threaded locking bolt 46 in a first direction and into receipt by the threaded lug 53 has the effect of moving the upper retaining plate 34 towards the lower retaining plate 36 to create a clamping force on any bicycle frame bars 82 that are supported between the oppositely facing gripping portions 38 and 40. In this same regard, rotating the threaded locking bolt 46 in an opposite direction and out of receipt by the threaded lug 53 causes the upper retaining plate 34 to move away from the lower retaining plate 36 to loosen the clamping force on the frame bars 82. With the upper and lower retaining plates 34 and 36 separated from one another and the clamping force reduced, the frame bar 82 of a bicycle (designated 80 in FIG. 1) may now be removed from or placed between a pair of the gripping portions 38 and 40 at one or both ends of the bicycle mount 32.

To facilitate the separation of the upper and lower retaining plates 34 and 36 of the bicycle mount 32 when it is desirable to reduce the clamping force therebetween, a normally expanded coil spring 56 is located between the retaining plates 34 and 36 so as to surround the locking bolt 46. As the upper and lower retaining plates 34 and 36 are moved together to increase the clamping force, the coil spring 56 is compressed and stores energy. However, as the upper and lower retaining plates 34 and 36 are moved apart, the coil spring 56 expands toward its initial condition and releases energy. The expansion of the coil springs 56 and the release of energy therefrom urges the upper retaining plate 34 away from the lower retaining plate 36 so that the clamping force is more quickly and easily reduced.

To facilitate the rotation of the locking bolt 46 in opposite directions so as to either increase or reduce the clamping force between the upper and lower retaining plates 34 and 36 of the bicycle mount 32, one end of a cranking tab 57 is pivotally connected to a relatively wide head 58 of the locking bolt 46. The head 58 of bolt 46 is seated upon the top of the upper retaining plate 34. As the threaded locking bolt 46 is rotated towards and into receipt by the threaded lug 53, the head 58 of locking bolt 46 urges the upper retaining plate 34 towards the lower retaining plate 36 so as to compress the coil spring 56 and increase the clamping force between the plates.

The cranking tab 57 is rotatable relative to the head 58 of locking bolt 46 between a vertical, unlocked position and a horizontal, locked position. As shown in FIG. 6, the cranking tab 57 is in the horizontal, locked position at which the locking bolt 46 can not be either intentionally or inadvertently rotated (e.g. such as by means of vibration or other physical forces that are generated when a bicycle is being transported by a motor vehicle to which the bicycle is coupled by the combination collapsible holder 1 and bicycle mount 32). With the cranking tab 57 in the horizontal, locked position, the upper and lower retaining plates 34 and 36 of bicycle mount 32 can not be accidentally separated from one another with the possibility that the frame 82 of a bicycle 80 would undesirably slip from between the gripping portions 38 and 40 while the vehicle is in motion.

To hold the cranking tab 57 in the horizontal, locked position of FIG. 6, a locking arm 59 is slidably mated to the end of cranking tab 57 which lies opposite the end of arm 59 that is pivotally connected to the locking bolt 46. The locking arm 59 is slidably received through a pair of axially aligned apertures 35 and 37 formed through the upper and lower retaining plates 34 and 36. A removably locking ring 84 is received through one end of the locking arm 59 to prevent the locking arm 59 from being pulled upwardly through and outwardly from the apertures 35 and 37. A relatively wide head 86 is formed at the opposite end of the locking arm 59 to prevent the locking arm 59 from being pushed or falling downwardly through and outwardly from the apertures 35 and 37. With the locking arm 59 extending through the apertures 35 and 37 as shown, the cranking tab 58 is anchored in place relative to the locking bolt 46 so that it will not be possible to impart a rotational force to the locking bolt, whereby to avoid a release of the clamping force against the bicycle frame 82 that is held between one of the pairs of gripping portions 38 and 40 of the bicycle mount 32.

However, when the motor vehicle is at rest and it is desirable to separate the upper and lower retaining plates 34 and 36, the locking ring 84 is first removed from the locking arm 59. Next, an upward pulling force is applied to the head 86 of locking arm 59 to cause the locking arm to slide upwardly and outwardly from the apertures 35 and 37 in the retaining plates 34 and 36 so as to be removed from the cranking tab 57. With the locking arm 59 removed from the cranking tab 57, it will now be possible to lift cranking tab 57 from the horizontal, locked position (as shown in FIG. 6) to the vertical, unlocked position (not shown) standing above the head 58 of locking bolt 46. In the vertical, unlocked position, a cranking force may now be applied to the cranking tab 57 or directly to the locking bolt 46 to cause the locking bolt 46 to rotate in either direction whereby to either increase or decrease the clamping force to be applied by the pairs of gripping portions 38 and 40 at the opposite ends of the upper and lower retaining plates 34 and 36 of the bicycle mount 32.

I claim:

1. A combination comprising:

a holder having first and second ends, the first end of said holder to be removably coupled to a trailer hitch of a motor vehicle; and a bicycle mount to be removably coupled to the second end of said holder, said bicycle mount including an upper retaining plate, a lower retaining plate positioned in opposite facing alignment with said upper retaining plate to receive and retain therebetween at least one frame bar of a bicycle, a locking bolt extending between said upper and lower retaining plates, said locking bolt being rotated in a first direction to cause said upper and lower retaining plates to be moved together to establish a clamping pressure on said at least one frame bar, and said locking bolt being rotated in an opposite direction to cause said upper and lower retaining plates to be moved apart to decrease the clamping pressure on said at lease one frame bar, a spring located between said upper and lower retaining plates, said spring being compressed to store energy when said locking bolt is moved in said first direction to cause said upper and lower retaining plates to be moved together, and said spring expanding to release the stored energy for urging said upper and lower retaining plates to be moved apart when said locking bolt is rotated in said opposite direction, and a locking arm coupled to said locking bolt to control the rotation of said locking bolt, said locking arm being detachably connected to said upper and lower retaining plates to prevent a rotation of said locking bolt, and said locking arm being detached from said upper and lower retaining plates to enable said locking bolt to be rotated.

2. The combination recited in claim 1, wherein said bicycle mount also includes a coupling post projecting from said lower retaining plate, said coupling post being sized to be removably coupled to the second end of said holder, whereby said bicycle mount is attached to the trailer hitch of the motor vehicle by way of said holder.

3. The combination recited in claim 1, wherein said bicycle mount also includes a threaded lug protecting from said lower retaining plate, said locking bolt having a threaded shank that is mated to and rotatable within said threaded lug for causing said upper and lower retaining plates to be moved together or apart depending upon whether said locking bolt is rotated in said first direction or said opposite direction.

4. The combination recited in claim 1, wherein said spring is a coil spring surrounding said locking bolt between said upper and lower retaining plates of said bicycle mount.

5. The combination recited in claim 1, wherein each of the upper and lower retaining plates of said bicycle mount includes at least one arcuate-shaped gripping portion, the arcuate shaped gripping portions of said upper and lower retaining plates being arranged in opposing alignment so as to receive and retain therebetween said at least one bicycle frame bar.

6. The combination recited in claim 1, wherein said locking bolt has a bolt head positioned to engage the upper retaining plate of said bicycle mount for urging said upper retaining plate to be moved towards said lower retaining plate to thereby increase the clamping pressure on said at least one bicycle frame bar when said locking bolt is rotated in said first direction.

7. The combination recited in claim 6, wherein said bicycle mount also includes a cranking tab connected between said bolt head and said locking arm by which said locking arm is coupled to said locking bolt, said cranking tab being rotatable relative to said locking bolt from an unlocked position, at which a cranking force is applied to said locking bolt to cause said locking bolt to rotate when said locking arm is detached from said upper and lower retaining plates, to a locked position, at which said cranking tab is anchored to prevent a rotation of said locking bolt when said locking arm is connected to said upper and lower retaining plates.

8. The combination recited in claim 7, wherein said upper and lower retaining plates of said bicycle mount have respective axially aligned apertures extending therethrough to slidably receive said locking arm to thereby anchor said cranking tab in said locked position at which to prevent a rotation of said locking bolt, said locking arm being slidable out of said axially aligned apertures to thereby enable said cranking tab to be rotated to said unlocked position at which to permit a rotation of said locking bolt.

9. The combination recited in claim 1, wherein said holder has at least first and second arm members that are pivotal relative to one another so as to be rotated towards and into facing alignment, said first arm member having the first end of said holder to be coupled to the trailer hitch and said second arm member having the second end of said holder to be coupled to said bicycle mount.

10. The combination recited in claim 9, wherein said holder also has a third arm member pivotally connected between said first and second arm members, said second arm member adapted to be rotated towards and into face-to-face alignment with said third arm member, and said third arm member adapted to be rotated towards and into face-to-face alignment with said first arm member to form a compact package with said second, third and first arm members arranged one above the other.

11. In combination:
a bicycle mount comprising:
an upper retaining plate;
a lower retaining plate positioned in opposite facing alignment with said upper retaining plate to receive and retain therebetween at least one frame bar of a bicycle;
a locking bolt extending between said upper and lower retaining plates, said locking bolt being rotated in a first direction to cause said upper and lower retaining plates to be moved together to establish a clamping force on said at least one frame bar, and said locking bolt being rotated in an opposite direction to cause said upper and lower retaining plates to be moved apart to decrease the clamping pressure on said at least one frame bar;
a spring located between said upper and retaining plates, said spring being compressed to store energy when said locking bolt is moved in said first direction to cause said upper and lower retaining plates to be moved together, and said spring expanding to release the stored energy for urging said upper and lower retaining plates to be moved apart when said locking bolt is rotated in said opposite direction;
a locking arm coupled to said locking bolt, said locking arm being slidably received through each of said upper and lower retaining plates at an aperture formed therein to prevent a rotation of said locking bolt in said first and opposite directions, said locking arm being removed from the aperture in said upper and lower retaining plates to permit a rotation of said locking bolt; and
a holder having first and second ends, the first end of said holder adapted to be removably coupled to a motor vehicle and the second end of said holder adapted to be removably coupled to said bicycle mount, whereby said bicycle mount is attached to the motor vehicle by way of said holder.

12. The combination recited in claim 11, wherein said holder has first, second and third arm members that are pivotal relative to one another so as to be rotated towards and into facing alignment, said first arm member having the first end of said holder to be removably coupled to the motor vehicle, said second arm member having the second end of said holder to be removably coupled to said bicycle mount, and said third arm member pivotally connected between said first and second arm member, said second arm member adapted to be rotated towards and into face-to-face alignment with said third arm member, and said third arm member adapted to be rotated towards and into face-to-face alignment with said first arm member to form a compact package with said second, third and first arm members arranged one above the other.

13. In combination:
a bicycle mount comprising:
an upper retaining plate,
a lower retaining plate positioned in opposite facing alignment with said upper retaining plate to receive and retain therebetween at least one frame bar of a bicycle;
a locking bolt extending between said upper and lower retaining plates, said locking bolt being rotated in a first direction to cause said upper and lower retaining plates to be moved together to establish a clamping force on said at least one frame bar, and said locking bolt being rotated in an opposite direction to cause said upper and lower retaining plates to be moved apart to decrease the clamping pressure on said at least one frame bar,
a spring located between said upper and retaining plates, said spring being compressed to store energy when said locking bolt is moved in said first direction to cause said upper and lower retaining plates to be moved together, and said spring expanding to release the stored energy for urging said upper and lower retaining plates to be moved apart when said locking bolt is rotated in said opposite direction;

a locking arm coupled to said locking bolt, said locking arm being slidably received by at least one of said upper and lower retaining plates at an aperture formed therein to prevent a rotation of said locking bolt in said first and opposite directions, said locking arm being removed from the aperture in said at least one of said upper and lower retaining plates to permit a rotation of said locking bolt;

a cranking tab extending between said locking bolt and said locking arm, said cranking tab applying a cranking force for causing said locking bolt to rotate when said locking arm is removed from the aperture in said at least one of said upper and lower retaining plates; and a holder having first and second ends, the first end of said holder adapted to be removably coupled to a motor vehicle and the second end of said holder adapted to be removably coupled to said bicycle mount, whereby said bicycle mount is attached to the motor vehicle by way of said holder.

* * * * *